(12) United States Patent
Thomas et al.

(10) Patent No.: US 11,425,865 B2
(45) Date of Patent: Aug. 30, 2022

(54) APPARATUS AND METHOD FOR PROCESSING A CROP RESIDUE

(71) Applicant: TECFARM PTY LTD, Western Australia (AU)

(72) Inventors: Lewis Thomas, Western Australia (AU); Matthew Barrett-Lennard, Western Australia (AU)

(73) Assignee: Tecfarm Pty Ltd, Bruce Rock (AU)

( * ) Notice: Subject to any disclaimer, the term of this patent is extended or adjusted under 35 U.S.C. 154(b) by 240 days.

(21) Appl. No.: 15/755,952

(22) PCT Filed: Aug. 26, 2016

(86) PCT No.: PCT/AU2016/050802
§ 371 (c)(1),
(2) Date: Feb. 27, 2018

(87) PCT Pub. No.: WO2017/035578
PCT Pub. Date: Mar. 9, 2017

(65) Prior Publication Data
US 2018/0249641 A1     Sep. 6, 2018

(30) Foreign Application Priority Data
Aug. 28, 2015   (AU) ................................ 2015903508

(51) Int. Cl.
  *A01F 29/00*   (2006.01)
  *A01F 29/02*   (2006.01)
  (Continued)

(52) U.S. Cl.
  CPC ............ *A01F 29/025* (2013.01); *A01F 7/067* (2013.01); *A01F 12/40* (2013.01); *B02C 13/06* (2013.01);
  (Continued)

(58) Field of Classification Search
  CPC ........ A01F 11/04; A01F 29/025; A01F 29/02; A01F 7/067; A01F 7/06; B02C 13/08;
  (Continued)

(56) References Cited

U.S. PATENT DOCUMENTS 574,303 A * 12/1896 Butterworth et al. .... A01F 7/06
460/80
1,457,693 A * 6/1923 Dorn ...................... B02C 13/20
241/39
(Continued)

FOREIGN PATENT DOCUMENTS

AU         3796695 A     5/1996
DE         3540493 C1    4/1987
(Continued)

OTHER PUBLICATIONS

International Searching Authority, International Search Report, PCT/AU2016/050802, dated Nov. 21, 2016.
(Continued)

*Primary Examiner* — Faye Francis
(74) *Attorney, Agent, or Firm* — Reichel Stohry Dean LLP; Mark C. Reichel; Natalie J. Dean (57) ABSTRACT

An apparatus and method for processing a crop residue, which includes but is not limited to, destroying weed seeds present in the crop residue. The apparatus (10) comprises an elongate housing (12) having an inlet (20) for receiving crop residue N and an outlet (22) for discharging the crop residue. The apparatus (10) also has one or more rotors (24), (26) located in the elongate housing (12). Each rotor (24), (26) comprises a plurality of radially extending impact members (28*a*), (28*b*), (28*c*), (28*d*), (28*e*), (28*f*) which rotate with the one or more rotors (24), (26) and impact against the crop residue, so that lighter material of the crop residue is
(Continued)

subjected to less impacts and denser material of the crop residue is subjected to relatively more impacts.

30 Claims, 6 Drawing Sheets

(51) Int. Cl.
  *B02C 13/20*   (2006.01)
  *B02C 13/06*   (2006.01)
  *A01F 12/40*   (2006.01)
  *B02C 13/288*   (2006.01)
  *B02C 13/18*   (2006.01)
  *B02C 23/28*   (2006.01)
  *B02C 23/30*   (2006.01)
  *B02C 21/02*   (2006.01)
  *A01F 7/06*   (2006.01)

(52) U.S. Cl.
  CPC .............. *B02C 13/18* (2013.01); *B02C 13/20* (2013.01); *B02C 13/288* (2013.01); *B02C 21/02* (2013.01); *B02C 23/28* (2013.01); *B02C 23/30* (2013.01); *A01F 7/06* (2013.01)

(58) Field of Classification Search
  CPC ......... B02C 13/10; B02C 13/12; B02C 13/20; B02C 23/28; B02C 9/02; B02C 23/30
  See application file for complete search history.

(56) References Cited

U.S. PATENT DOCUMENTS

| | | | |
|---|---|---|---|
| 3,897,014 A | 7/1975 | Luthi | |
| 4,245,999 A | 1/1981 | Reiniger | |
| 4,739,773 A * | 4/1988 | West | A01F 12/442 460/113 |
| 5,941,467 A * | 8/1999 | McArdle | B02C 13/288 241/5 |
| 6,217,442 B1 | 4/2001 | Schmidt | |
| 2005/0263632 A1* | 12/2005 | Howard | B02C 13/09 241/189.1 |
| 2008/0064457 A1 | 3/2008 | Lamont | |
| 2009/0256375 A1* | 10/2009 | Haskins | B60P 3/14 296/24.32 |
| 2011/0059782 A1* | 3/2011 | Harrington | B02C 13/205 460/149 |
| 2013/0305969 A1 | 11/2013 | Trebucchi et al. | |
| 2014/0179383 A1* | 6/2014 | Isaac | A01F 12/40 460/112 |
| 2015/0059620 A1* | 3/2015 | Cox | B01F 3/1214 106/273.1 |

FOREIGN PATENT DOCUMENTS

| | | | | |
|---|---|---|---|---|
| DE | 4026924 A1 | 2/1992 | | |
| EP | 1195201 A1 | 4/2002 | | |
| FR | 985439 A | 7/1951 | | |
| FR | 1015467 A | * | 10/1952 | ............. B02C 13/08 |
| GB | 582993 A | 12/1946 | | |
| WO | 2017008161 A1 | 1/2017 | | |

OTHER PUBLICATIONS

International Searching Authority, Written Opinion of the International Searching Authority PCT/AU2016/050802, dated Nov. 21, 2016.
International Preliminary Examining Authority, International Preliminary Report on Patentability (Corrected), PCT/AU2016/050802, dated Dec. 21, 2017, Including Annexes.

* cited by examiner

APPARATUS AND METHOD FOR PROCESSING A CROP RESIDUE

FIELD OF THE INVENTION

The present invention relates to an apparatus and method for processing a crop residue, including but not limited to processing crop residue for destroying weed seeds in the crop residue.

BACKGROUND

Infestation of weeds in crop fields reduces the productivity of farms. Traditional harvesting equipment threshes harvested material and separates the grain for storage while expelling and spreading the crop residue including straw, chaff and weed seeds. This allows unwanted weed seeds to germinate in subsequent cropping seasons in the crop fields.

A typical means of controlling annual weed population is the use of herbicides. However, the prolonged exposure of herbicides has resulted in weeds developing resistance to these chemicals.

Current techniques for controlling weed populations have concentrated upon the harvest weed seed control paradigm. This involves targeting weed seeds during crop harvest by collecting and managing weed seed bearing crop residue. The collection and management is conducted using a form of harvest weed seed control system, such as a chaff cart or a towed baler. This post-harvest crop residue is further processed in order to destroy the weed seeds, via the burning of chaff heaps, or disposing of the weed seed, via distributing the bales as feed for livestock.

A recent development in harvest weed seed control systems is the inclusion of a cage mill to further process the crop residue as demonstrated in Australian Patent No. 2009214835. This destroys weed seeds found within the crop residue. However, the use of a cage mill for destroying the weed seeds is an energy inefficient process. Additionally, the cage mill is a complicated instrument which is costly to manufacture and maintain.

The present invention seeks to overcome, or at least substantially ameliorate, the disadvantages and/or shortcomings of the background art or to provide an alternative.

In this specification the terms "comprising" or "comprises" are used inclusively and not exclusively or exhaustively.

Any references to documents that are made in this specification are not intended to be an admission that the information contained in those documents form part of the common general knowledge known to a person skilled in the field of the invention, unless explicitly stated as such.

SUMMARY OF THE INVENTION

According to an aspect of the invention, there is provided an apparatus for processing a crop residue, comprising:
a housing having an inlet for receiving the crop residue and an outlet for discharging the crop residue;
one or more rotors located in the housing, each rotor comprising a plurality of radially extending impact members;
wherein the plurality of radially extending impact members are configured to rotate with the one or more rotors and impact against the crop residue, so that lighter material of the crop residue is subjected to less impacts and denser material of the crop residue is subjected to relatively more impacts.

In an embodiment of the invention, the housing is elongate.

In an embodiment of the invention, at least one rotor further comprises at least one radially extending pitched member arranged to urge the crop residue to move through the elongate housing.

In an embodiment of the invention, at least two radially extending pitched members are located at different points along each shaft of the one or more rotors.

In an embodiment of the invention, the apparatus for processing a crop residue further comprises one or more blowers arranged to urge the crop residue to move through the elongate housing.

In an embodiment of the invention, at least one blower is located at an inlet end of the elongate housing.

In an embodiment of the invention, the housing is inclined relative to the horizontal.

In an embodiment of the invention, the housing is shaped so that it approximates the outer dimensions of the one or more rotors.

In an embodiment of the invention, the housing is shaped so that it substantially follows the orbit of a tip of the impact members.

In an embodiment of the invention, the apparatus for processing a crop residue comprises two rotors located in the housing.

In an embodiment of the invention, the two rotors are aligned parallel to each other.

In an embodiment of the invention, there is a gap separating each of the two rotors from each other between the tips of the impact members.

In an embodiment of the invention, the two rotors are aligned parallel to each other, so that the plurality of radially extending impact members overlap one another in an area of interaction.

In an embodiment of the invention, the plurality of radially extending impact members overlap is in a radial direction with a gap in an axial direction.

In an embodiment of the invention, the plurality of radially extending impact members overlap is in an axial direction with a difference in timing of the impact members being located in an overlapping position.

In an embodiment of the invention, the housing is shaped so that an interior wall of the housing guides the crop residue into the orbital path of the plurality of radially extending impact members.

In an embodiment of the invention, each of the rotors rotate in the same direction so that the plurality of radially extending impact members of each rotor travel in orbitally opposing directions when the tips are close to each other.

In an embodiment of the invention, the plurality of impact members rotate with velocity so as to damage weed seeds upon impact.

In an embodiment of the invention, the apparatus for processing a crop residue is mounted to a wheeled chassis.

In an embodiment of the invention, the apparatus for processing a crop residue is mounted to a mechanical harvester.

In an embodiment of the invention, the one or more rotors comprise only two rotors.

In an embodiment of the invention, each impact member comprises a blunt bar.

In an embodiment of the invention, the housing is shaped in the form of two parallel longitudinally intersecting partial cylinders which are connected at a pair of internal walls.

In an embodiment of the invention, the apparatus for processing a crop residue is configured so that the heavier/ denser material is seeds which are impacted so as to damage a substantial amount of seed in the crop residue before it exits the outlet and the lighter/less dense material is the remainder of the crop residue which has received fewer or no impacts than the seeds when it exits the outlet.

In an embodiment of the invention, the inlet comprises a bin for receiving crop residue.

In an embodiment of the invention, the bin comprises an auger for moving crop residue from the bin inside of the housing.

In an embodiment of the invention, the housing comprises a restricted opening. In an embodiment, the restricted opening is defined by a hole in an end wall of the housing.

In an embodiment of the invention, each rotor comprises a centrifugal fan for blowing crop residue through the housing at the inlet end of the housing.

In an embodiment of the invention, the outlet comprises a restricted opening in an end wall of the housing. The restricted opening is preferably in the form of an annulus.

In an embodiment of the invention, the apparatus comprises a spreader.

In an embodiment of the invention, the spreader comprises a paddle to move crop residue from the outlet out of the spreader.

In an embodiment of the invention, the one or more augers rotate in the same direction as the one or more rotors.

In an embodiment of the invention, the one or more augers rotate at the same speed as the one or more rotors.

According to a second aspect of the invention, there is provided an apparatus for processing a crop residue, comprising:
an elongate housing configured to pass the crop residue through the housing from an inlet to an outlet; and
one or more rotors located in the housing;
wherein the one or more rotors is configured with impact means for interacting with the crop residue, so that a lighter crop residue is subjected to less interactions and a denser seed crop residue is subjected to more interactions.

In an embodiment of the invention, the housing is elongate.

In an embodiment of the invention, the apparatus for processing a crop residue further comprises blowing means to urge the crop residue to move through the housing.

In an embodiment of the invention, the apparatus for processing a crop residue further comprises inclining means to tend to retain denser material of the crop residue in the housing.

In an embodiment of the invention, the housing is arranged to direct crop residue into the impact means.

In an embodiment of the invention, impacts of the impact means tend to transform the denser seed crop residue into the lighter crop residue. In an embodiment the lighter crop residue is more prone to be blown through the housing than the denser seed crop residue. In an embodiment a third form of material is smaller than the lighter crop residue and is subjected to relatively less interactions.

In an embodiment of the invention, the impact means are configured to damage weed seeds.

In an embodiment of the invention, the apparatus is configured so that the denser seed crop residue is impacted so as to damage a substantial amount of seed in the seed crop residue before it exits the outlet and the lighter crop residue has received fewer impacts than the seeds crop residue or no impacts when it exits the outlet.

According to a third aspect of the invention, there is provided a method for processing a crop residue, comprising:
receiving the crop residue in an inlet of a housing in the form of two intersecting partial cylinders;
subjecting the crop residue to impacts with a plurality of rotating radially extending impact members, wherein lighter material of the crop residue is subjected to less impacts and denser material of the crop residue is subjected to more impacts; and
discharging the crop residue from an outlet of the housing.

In an embodiment of the invention, the method for processing a crop residue further comprises blowing the crop residue through the housing.

In an embodiment of the invention, the method for processing a crop residue further comprises inclining the housing so as to tend to retain denser material of the crop residue in the housing.

In an embodiment of the invention, the method for processing a crop residue further comprises directing the crop residue into the orbital path of the impact members.

In an embodiment of the invention, the method for processing a crop residue further comprises the impact members causing damage to weed seeds.

Throughout the specification and claims, unless the context requires otherwise, the word "comprise" or variations such as "comprises" or "comprising", will be understood to imply the inclusion of a stated integer or group of integers but not the exclusion of any other integer or group of integers.

DESCRIPTION OF DRAWINGS

In order to provide a better understanding of the present invention embodiments will now be described, by way of example only, with reference to the drawings, in which:—

DETAILED DESCRIPTION

A mechanical harvester produces a continuous stream of crop residue which must be processed quickly, and if possible, efficiently in one pass to render weed seeds nonviable and still allow valuable nutrients/organic matter in waste material to be spread back over a growing area. This avoids a second operation, post-harvest, to process the crop residue.

Crop residue from a mechanical harvester is predominantly chaff from harvested crops. Weed seeds are also found alongside the chaff, and as such, is a portion of the crop residue. There is a noticeable difference between the characteristics of chaff and those of weed seeds. The chaff, being the leftover protective casing of the threshed crop, has a low mass relative to greater surface area and is more susceptible to being influenced by air flow. The weed seeds have a higher mass relative to less surface area than the chaff and are less influenced by airflow. It is this difference in the physical properties of the crop residue that allows the invention to effectively and efficiently destroy the weed seeds found in the crop residue.

Figure 1:
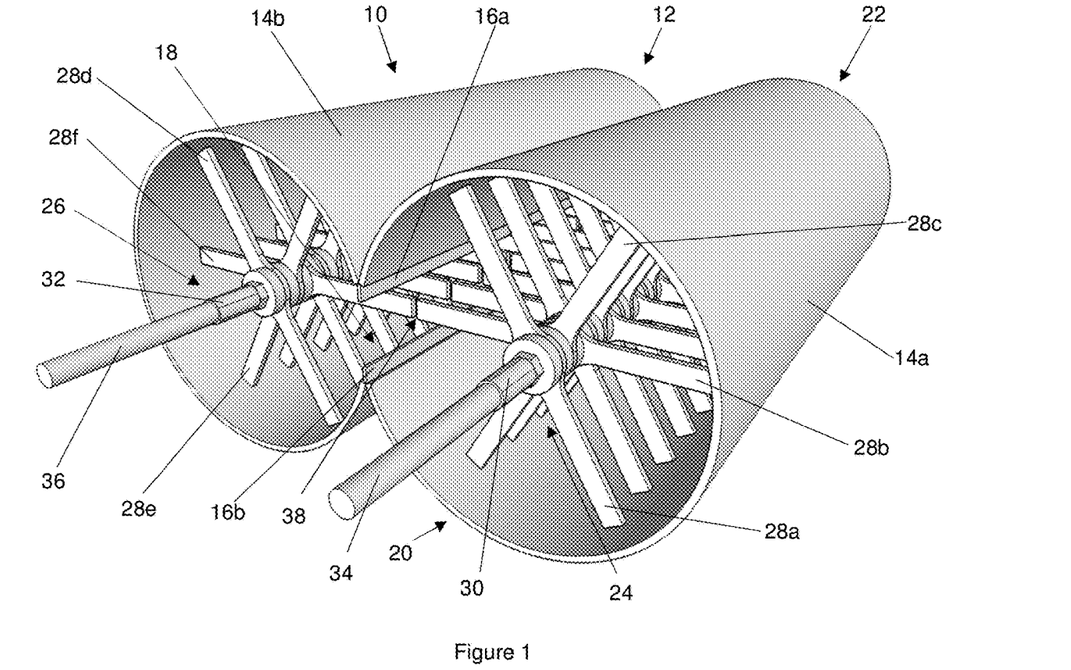
FIG. 1 is a perspective view of the main body of the apparatus.

FIG. 1 illustrates an apparatus 10 used for processing crop residue according to a preferred embodiment of the invention. The apparatus 10 comprises an elongate housing 12. The elongate housing 12 is shaped in the form of two parallel longitudinally intersecting partial cylinders 14a, 14b which may be connected at a pair of internal walls 16a, 16b. This shape allows for a pair of rotors 24, 26 to be housed within the elongate housing 12, so that the interior wall of the elongate housing 12 approximates the outer dimensions of the rotors 24, 26 and follows the orbit of a tip of the rotor 24, 26 when rotating. Additionally, the elongate housing 12 is shaped so that the rotors 24, 26 will not come into contact with the interior wall of the elongate housing 12.

The elongate housing 12 has an opening at one end, defining an inlet 20 for receiving the crop residue, and an opening at the other end, defining an outlet 22 for discharging the crop residue. The inlet 20 may be at an end of the housing, or it may be in an opening in the one or both internal walls 16a, 16b. The gap between the internal walls 16a, 16b forms a passageway 18 which allows material from each cavity of the partial cylinders 14a, 14b to travel from one to the other. The interior wall of the elongate housing 12 is further shaped to encourage crop residue passing through the elongate housing 12, to initially travel towards the interior wall and travel orbitally around the interior wall. The crop residue is able to transition between the two parallel partial cylinders 14a, 14b through the passageway 18.

In another embodiment, the elongate housing 12 may be shaped in a form comprising a single complete cylinder with only one rotor. In a further embodiment, the elongate housing 12 may be shaped in the form comprising more than two partial cylinders connected together along with corresponding rotors.

It will be appreciated by a person skilled in the art that the apparatus 10 may have an exterior of any suitable shape or dimension. Additionally, the partial cylinders may be of different diameters.

The rotors 24, 26 extend axially in the elongate housing 12 and are aligned parallel to each other in their respective partial cylinders 14a, 14b. Each of the rotors 24, 26 are comprised of a plurality of radially extending impact members 28a, 28b, 28c, 28d, 28e, 28f, in the form of impact bars, which are mounted on a hub 30, 32 of each shaft 34, 36. Preferably the bars are blunt and intended to smash seeds, rather than sharp for cutting. In this example, the impact members 28a, 28b, 28c, 28d, 28e, 28f are arranged as repeating sets of three impact members, such as the sets defined by impact members 28a, 28b, 28c and 28d, 28e, 28f as seen in FIG. 1. This arrangement has each impact member at a different angle to the others, but spaced appropriately along the shaft 34, 36 so that the centre of mass is substantially placed on the shaft axis to minimise vibration. It will be appreciated that the rotation of the impact members will induce a rotational airflow in the housing.

A blower is provided so as to move air through the housing from the inlet 20 to the outlet 22. In this embodiment the shaft axis coincides with an axis of a blower in the form of a fan. This provides the advantage of increasing axial airflow through the housing 12 and increasing the chances of the impact members 28a, 28b, 28c, 28d, 28e, 28f interacting with crop residue moving through the elongate housing 12. It would be appreciated by a person skilled in the art that any number of impact members or sets of impact members may be mounted on the shaft 34, 36. Additionally, it would be appreciated that the impact members may be of any suitable shape.

In an embodiment, there are two integrally formed impact members mounted on the hub, wherein the impact members are at 180° to each other. It would be appreciated by a person skilled in the art that any number of impact members may be mounted on the hub.

In an embodiment, the number of radially extending impact members may vary along the length of the shaft.

In an embodiment, each consecutive impact member is at an angle of 60° to the previous impact member.

In an embodiment, each of the impact members have equal axial spacing from another. In an example, this axial spacing is 50 mm between each of the impact members.

In an embodiment, the hub is hexagonal in shape. It would be appreciated by a person skilled in the art that the hub may be of any suitable shape to key the impact members to the hub.

The impact members 28a, 28b, 28c, 28d, 28e, 28f are configured to rotate with the shafts 34, 36 and impact against the crop residue that is received in the inlet 20. As the crop residue travels from the inlet 20 to the outlet 22, the impact members 28a, 28b, 28c, 28d, 28e, 28f impact against the material of the crop residue. Airflow created from the rotors 24, 26 or an external source (such as a fan) urges the lighter material comprising a relatively larger portion of the crop residue, such as the chaff, towards the outlet 22. This results in the lighter material being urged through the elongate housing 12 closer to the axis of rotation, wherein it is subjected to lower impact member speeds as a result of being closer to the rotational centre. Further, less aerodynamic material such as chaff, that is shaped to catch more of the airflow will tend to be blown through the housing 12 more quickly than material, such as a weed seed, is less inclined to be caught by the airflow. The less aerodynamic material will have less time to be acted upon by the impact members due to flow rate through the housing 12. Conceptually, weed seeds are generally denser material than chaff. The denser material comprising a relatively smaller portion of the crop residue, predominantly the weed seeds, tends to be retained in the elongate housing 12 as it is less readily urged by the rotational airflow produced by the rotors 24, 26 and the axial airflow produced by the blower. Additionally, the denser material is flung centrifugally to the inside wall of the elongate housing 12, wherein airflow may be reduced due to surface friction. The denser material then travels orbitally along the inside wall in a direction towards to the outlet 22. As the denser material travels along the inside walls, it will transition from the inside wall of one of the partial cylinders 14a, 14b to the other via the passageway 18. During its transition through the passageway 18, the denser material will be directed into the path of the outermost edges of the impact member 28a, 28b, 28c, 28d, 28e, 28f on the adjacent rotor 24, 26 moving in a transverse direction, subjecting the denser material to an impact with substantial force. This results in the denser material being damaged and/or reduced to smaller fragments of less mass. This process will repeat so that the denser material will be subjected to more impacts from the impact members 28a, 28b, 28c, 28d, 28e, 28f until reduced to fragments that are comparable to the lighter material of the crop residue. These fragments will then be increasingly urged by the airflow towards the outlet 22 due to the reduction in mass and increase in surface area. It would be appreciated by a person skilled in the art that the rotors 24, 26 typically rotate in the same direction to ensure that the plurality of radially extending impact members 28a, 28b, 28c, 28d, 28e, 28f of each rotor 24, 26 travel in orbitally opposing directions when the tips are close to each other. However, in another embodiment the rotors 24, 26 may rotate in opposite directions.

The impact members 28a, 28b, 28c, 28d, 28e, 28f are spaced along the length of the shafts 34, 36 so to impart a desired degree of orbital motion and subsequent impact to crop residue at any position within the elongate housing 12. Additionally, the impact members 28a, 28b, 28c, 28d, 28e, 28f are appropriately spaced so that the tips of the impact members 28a, 28b, 28c, 28d, 28e, 28f are separated by a small distance 38 located within the passageway 18.

Figure 2:
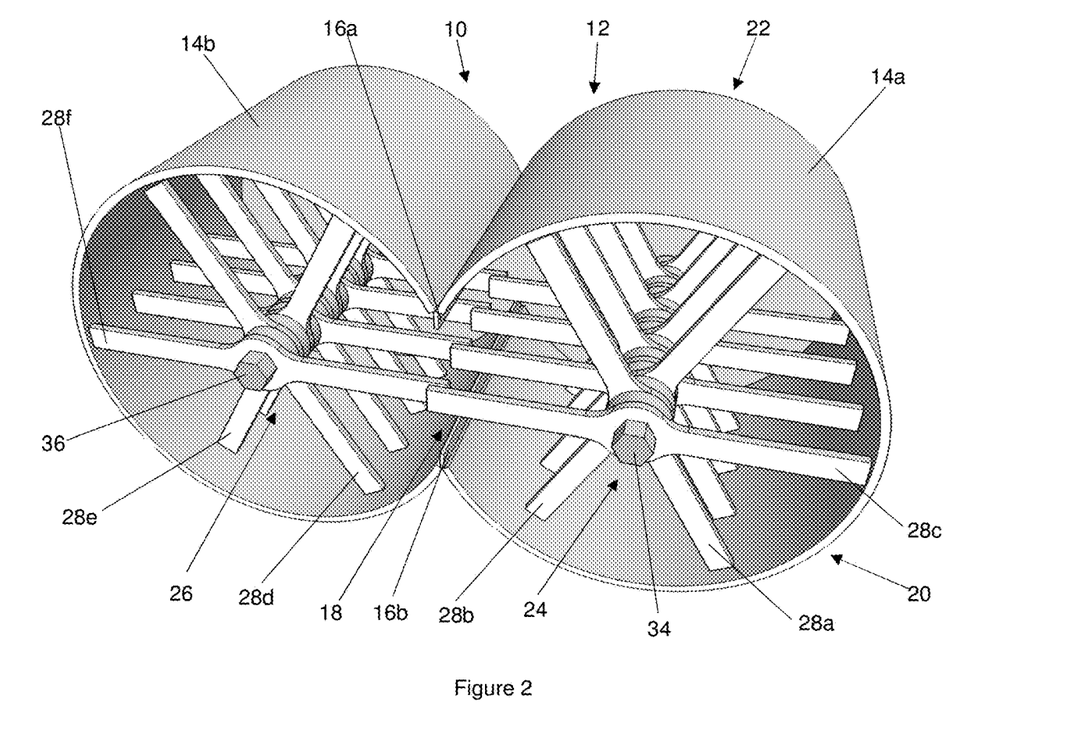
FIG. 2 is a perspective view of another main body of the apparatus.

FIG. 2 illustrates another embodiment of the apparatus 10, wherein the impact members 28a, 28b, 28c, 28d, 28e, 28f may be appropriately spaced and the shafts 34, 36 may be appropriately staggered in relation to each other to enable the orbital paths of the impact members 28a, 28b, 28c, 28d, 28e, 28f to overlap in an area of interaction. The advantage provided by the overlapping impact members 28a, 28b, 28c, 28d, 28e, 28f is the increased chance of crop residue transitioning from a partial cylinder 14a, 14b to the other, being struck by the impact members 28a, 28b, 28c, 28d, 28e, 28f.

In a further embodiment, one or more of the impact members 28a, 28b, 28c, 28d, 28e, 28f may be of any other shape or dimension, such as in the form of a blade, as long as it achieves efficacy and is dimensioned so as to be safely contained within the elongate housing 12. In an example the impact members are in the form of bars with a diameter of 475 mm. In another example, the impact members are in the form of blades with a diameter of 500 mm.

The rotors 24, 26 may rotate at any speed to achieve efficacy. Additionally, the rotors 24, 26 may be rotating at the same speed or at independent and or variable speeds. In an example, both rotors 24, 26 may rotate at a variable speed ranging from 1,000 to 1,500 revolutions per minute (rpm). In another example, one rotor 24 may rotate at a fixed speed of 1,000 rpm while the other rotor 26 may have a variable speed ranging from 1,000 to 1,500 rpm. In a further example, both rotors 24, 26 may rotate at a preferred variable speed ranging from 800 to 2,000 rpm.

In an embodiment, the elongate housing 12 may be inclined so that the outlet 22 is elevated higher than that of the inlet 20. By elevating the elongate housing 12, the denser material of the crop residue tends to be retained in the elongate housing 12 due to gravity. This provides the advantage of subjecting the denser materials to more impacts from the impact blades 28a, 28b, 28c, 28d, 28e, 28f. In an example, the elongate housing 12 is inclined at an angle of 5° to the horizontal. In another example, the elongate housing 12 is inclined at a suitable angle, such as an angle of 10°, 15°, 20°, 25° or 30° to the horizontal. In a further example, the elongate housing 12 is inclined at a preferred angle, such as an angle of 45°, 60°, 75°, 80°, 85° or 90° to the horizontal.

In an embodiment, the outlet 22 may have means of spreading the processed crop residue that is discharged. Additionally, the outlet 22 may have means of further projecting the processed crop residue or reducing the projection of the processed crop residue.

Figure 3:
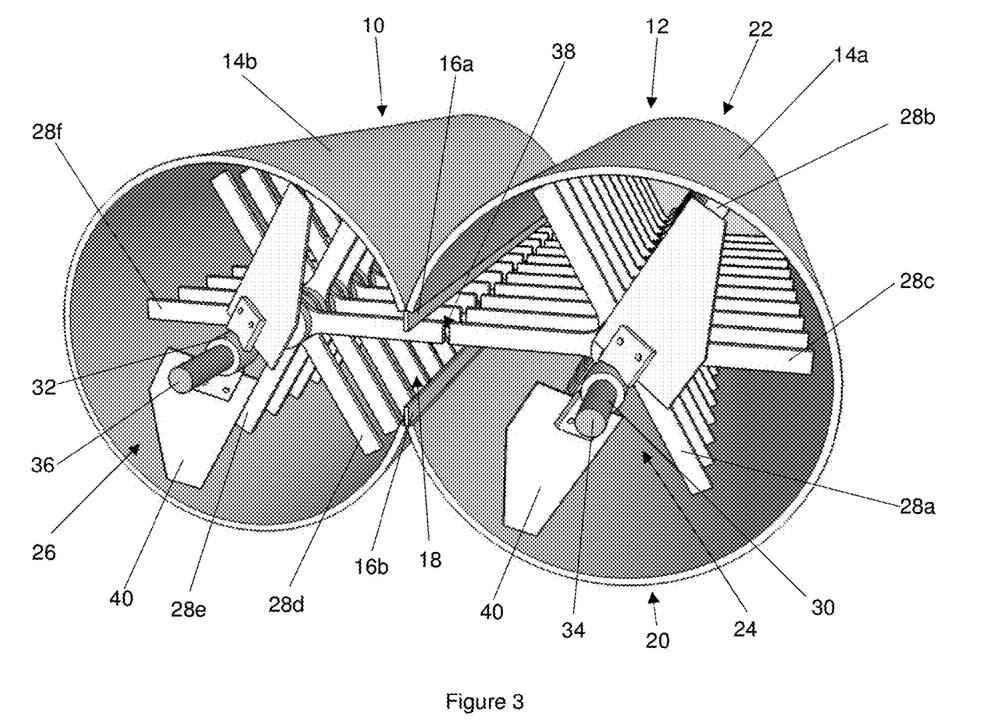
FIG. 3 is a perspective view of the main body of the apparatus according to FIG. 1 having a means of producing additional airflow.

FIG. 3 illustrates the apparatus 10 having a pitched blade 40 mounted to the shaft 34, 36 and located at the entrance of the inlet 20 of the elongate housing 12. The pitched blade 40 is used as a fan or blower to produce axial airflow, thereby urging the crop residue to move through the elongate housing 12. It would be appreciated by a person skilled in the art that more than one pitched blade 40 may be mounted throughout the length of the rotor 24, 26 to create additional airflow to further urge crop residue to move through the elongate housing. Additionally, it would be appreciated that the pitch of the pitched blade 40 may be variable.

In an embodiment, an independent blower may be located before or at the inlet 20 of the elongate housing 12 to produce axial airflow for urging crop residue to move through the elongate housing. The blower may be any conventional blower, such as by way of example, a centrifugal fan.

Figure 4:
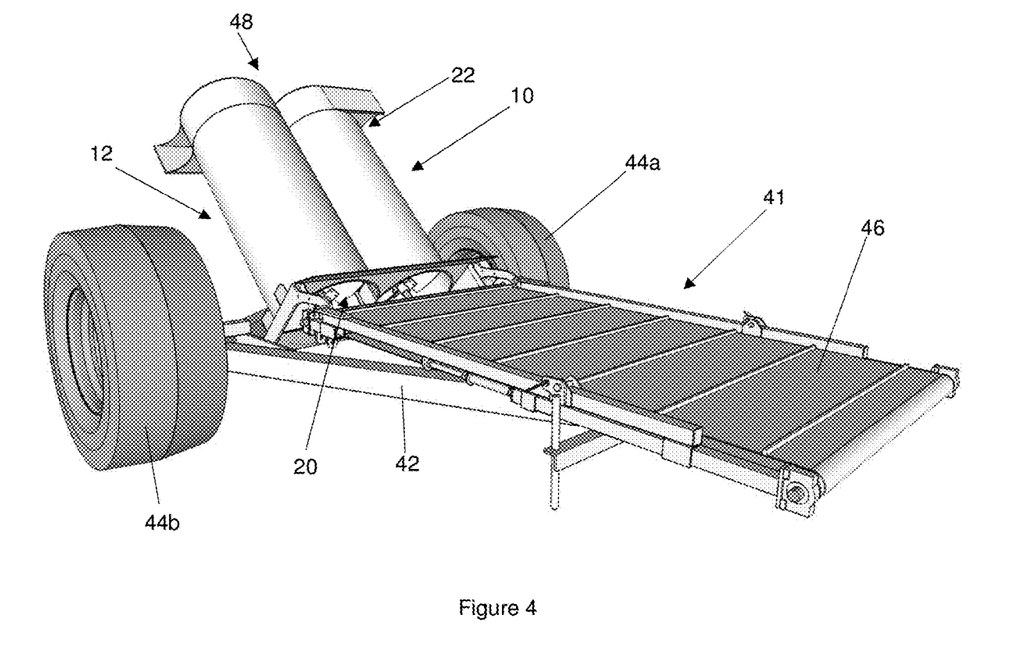
FIG. 4 is a perspective view of the apparatus mounted to a wheeled chassis.

FIG. 4 illustrates the apparatus 10 being mounted, inclined to the horizontal, to a wheeled chassis 41 to form a system with a mechanical harvester (not shown). The wheeled chassis 41 comprises a frame 42, a pair of wheels 44a, 44b and a means of transporting crop residue 46 from the mechanical harvester to the inlet 20 of the main body 12 for processing by the apparatus 10. In this example, the means of transporting crop residue 46 is in the form of a conveyor belt system. It would be appreciated by a person skilled in the art that any conventional means for depositing the crop residue into the inlet 20 may be used. Additionally, in this example the apparatus 10 has a means of distributing the processed crop reside in the form of a spreader 48.

Figure 5:
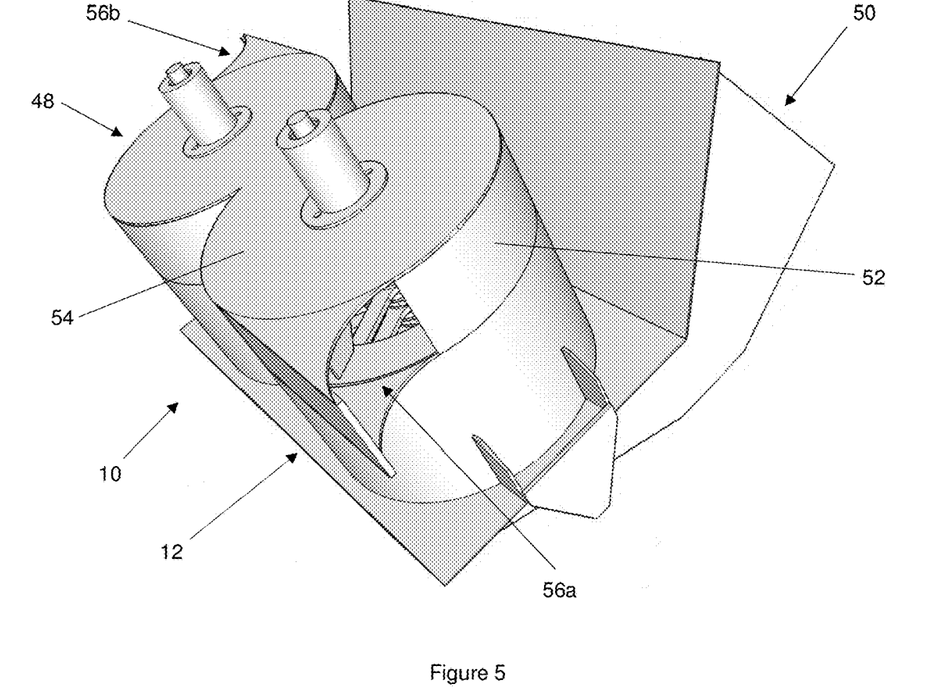
FIG. 5 is a perspective view of the apparatus mounted to a portion of a mechanical harvester.

In another embodiment, the apparatus may be mounted directly to the mechanical harvester. FIG. 5 illustrates an example of the apparatus 10 being mounted directly to a mechanical harvester at a crop residue output 50. The apparatus 10 includes the spreader 48 which is mounted to the housing 12 at the outlet 22. The spreader 48 comprises a spreader housing 52, of substantially the same shape as that of the elongate housing 12, and a roof 54. The spreader housing 52 has a pair of outlets 56a, 56b for distributing the processed crop residue.

Figure 6:
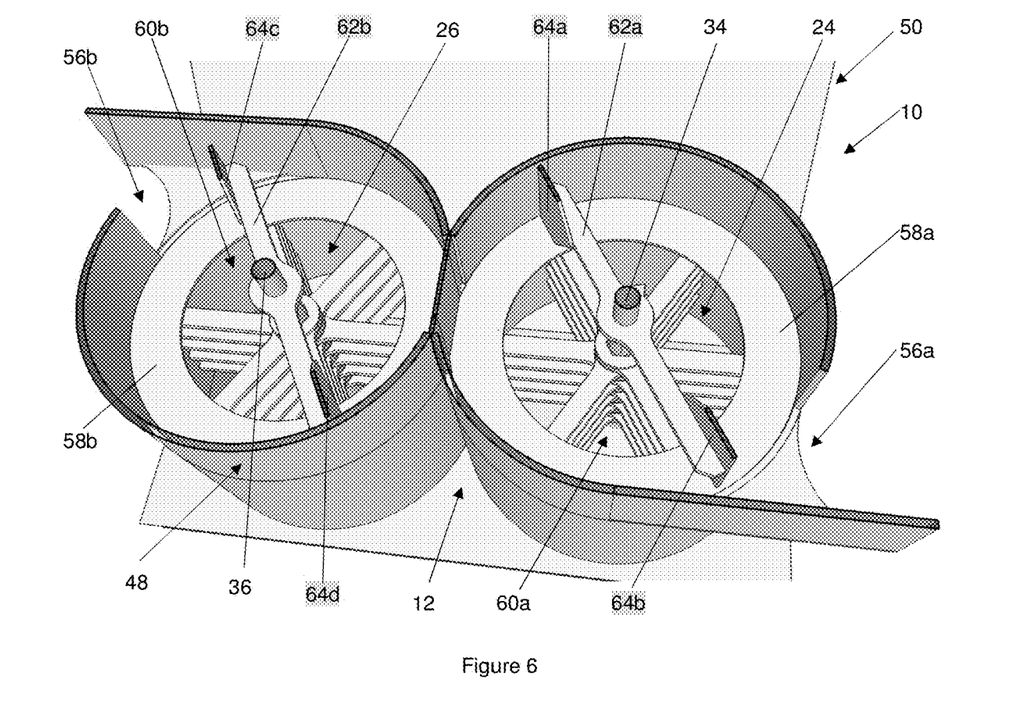
FIG. 6 is a perspective view of the apparatus according to FIG. 5 having a means of distributing the processed crop residue.

FIG. 6 shows the internal components of the spreader 48. In this example, the spreader 48 further comprises a pair of barriers 58a, 58b located at the base of the spreader 48 wherein it is mounted to the outlet 22 of the elongate housing 12. The pair of barriers 58a, 58b extend radially inwards from the inner wall of the spreader housing 48, to define a pair of gaps 60a, 60b that receives the processed crop residue from the outlet 22. The role of the pair of barriers 58a, 58b is to retain the denser material of the crop residue, which might not have been fully processed by the rotors 24, 26, in the housing 12. In practice, the denser material being weed seeds, which has escaped destruction by the rotors 24, 26, are trapped within the elongate housing 12 and are not distributed into the crop fields to germinate until they are broken down in size and weight so as to escape through the gaps 60a or 60b. The processed crop residue which passes through the gaps 60a, 60b are contained in the space defined by the spreader housing 52 and the roof 54. Housed within this space, are a plurality of integrally formed transverse arms 62a, 62b, which in this embodiment are at 180. degree. to each other, which are engaged to and radially extend from the shafts 34, 36. A plurality of paddles 64a, 64b, 64c, 64d are connected to the ends of the transverse arms 62a, 62b, which are used to urge the processed crop residue towards the outlets 56a, 56b as they rotate about an axis parallel to the shafts 34, 36. It would be appreciated that the transverse arms need not be integrally formed and may be comprised of a plurality of transverse arms.

Figure 7:
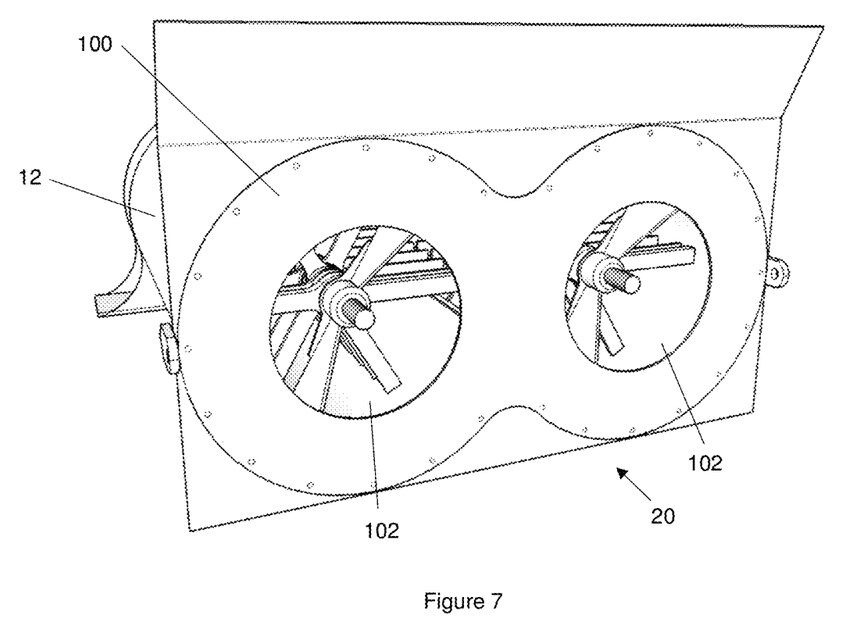
FIG. 7 is a perspective view of the inlet of the apparatus.

FIG. 7 shows the cover 100 covering the inlet 20 to the elongate housing 12. The cover serves to direct the crop residue towards the rotors by having the rotors surrounded by apertures 102 centred so that the rotor centre is located in the centre of the aperture. The cover 100 is removable, being fastened by a number of screws.

Figure 8:
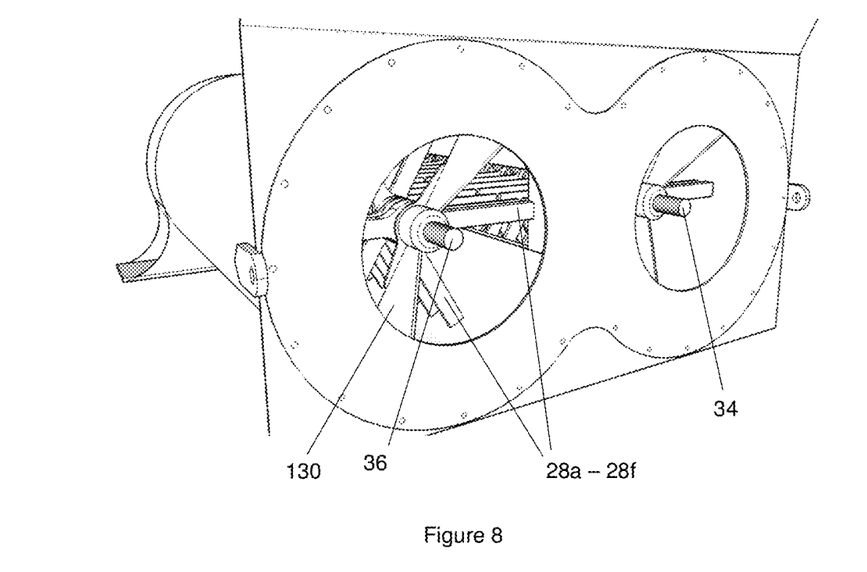
FIG. 8 is an enlarged perspective view of the inlet of the apparatus.

FIG. 8 shows an enlarged view of FIG. 7, where the impact members 28a-28f are clearly viewable as being inline between one shafts 36 impact member to the second shafts 34 impact member. The impact members 28a-28f between rotors 24, 26 are also clearly viewable as being separated by a marginal gap, so that they do not clash onto each other during rotation.

Figure 9:
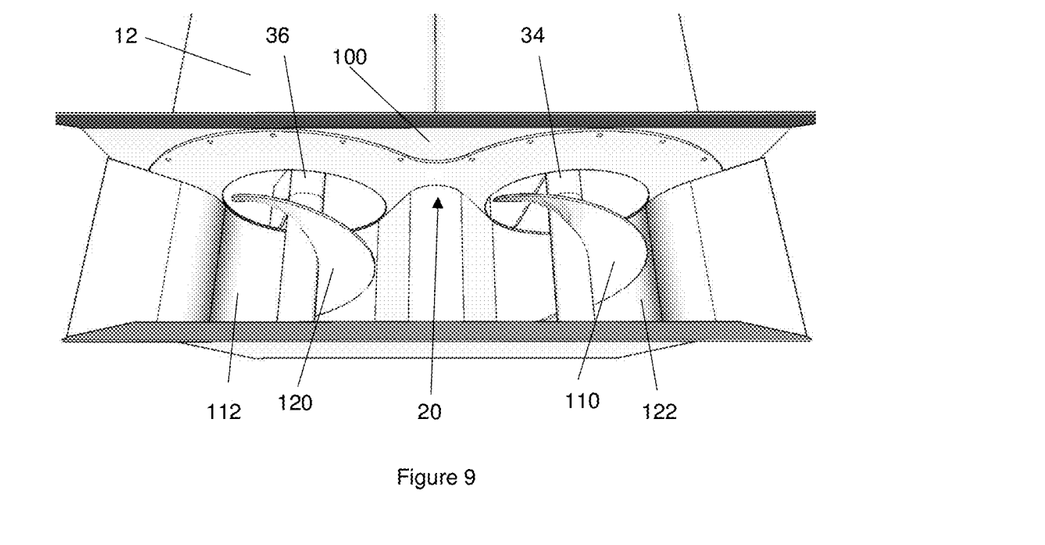
FIG. 9 is a top view of the inlet of the apparatus.

FIG. 9 shows the internal components of the augers 110, 120 within respective bins 112, 122 at the inlet 20 of the elongate housing 12. The augers 110, 120 direct the crop residue toward the inlet 20 of the elongate housing 12. The augers are located in front of the cover 100 and are positioned to be inline and centred with the shafts 34, 36 of the elongate housing 12.

Figure 10:
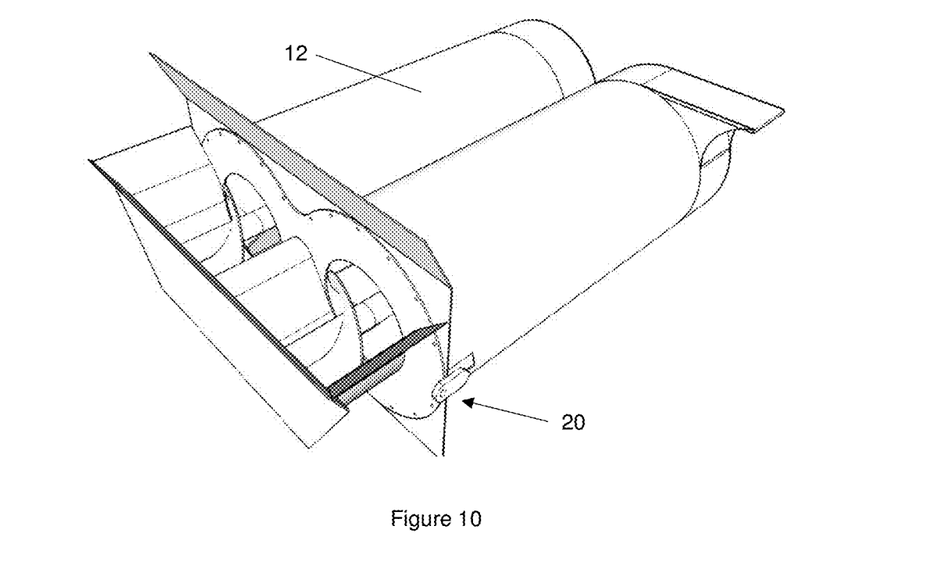
FIG. 10 is a side view of the inlet of the apparatus and the elongate housing.
Figure 11:
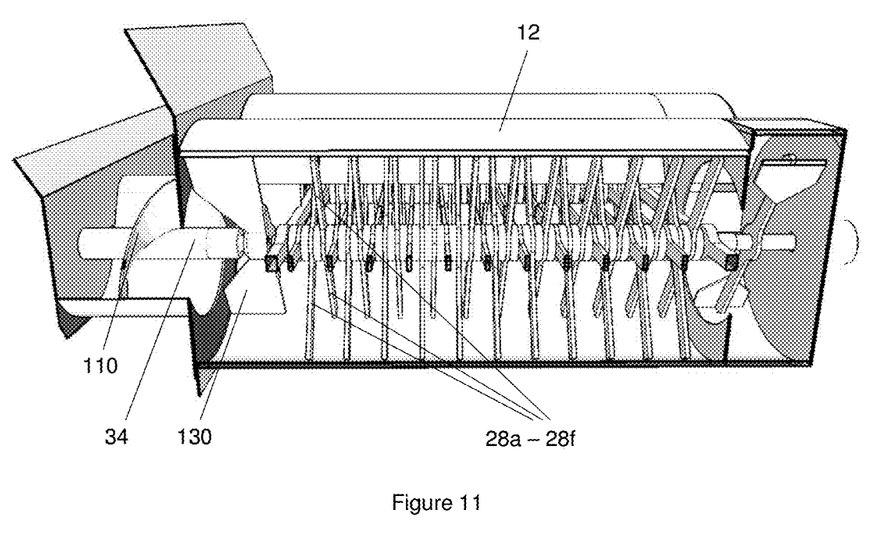
FIG. 11 is a cross-sectional side view of the inlet of the apparatus and the elongate housing showing the impact members.

FIG. 10 shows a side view of the inlet 20 of the apparatus and the elongate housing 12 and FIG. 11 shows a cross-sectional view of the apparatus showing the impact members 28a-28f, the paddle 130 which can be pitched so as to function as the pitched blade 40. The paddle 130 may also act as a blower. FIG. 11 further shows the augers 110, 120 (120 hidden from view), the shafts 34, 36 (36 hidden from view) and the elongate housing 12.

The method of operation and use of the apparatus 10 used for processing crop residue will now be described in more detail.

The apparatus 10 processes the crop residue by receiving the crop residue in the inlet 20 of the elongate housing 12 and subjecting the crop residue to impacts from a plurality of rotating radially extending impact members 28a, 28b, 28c, 28d, 28e, 28f. The plurality of radially extending impact members 28a, 28b, 28c, 28d, 28e, 28f are rotated via the rotation of the shaft 34, 36 in which the impact members are mounted to. The rotation of the impact members 28a, 28b, 28c, 28d, 28e, 28f in combination with the shape of the elongate housing 12 and a blower, in the form of the pitched blade 40 or an external blower, causes the lighter material of the crop residue, in the form of straw and chaff, to be urged to move through the elongate housing 12 to the outlet 22 so that the lighter material is subjected to less impacts. The denser material of the crop residue, including weed seeds, tends not to be urged to move through the elongate housing 12, thereby subjecting the denser material to more impacts. This results in the denser material being reduced into smaller fragments, devitalising the weed seeds. Subsequently, the denser material is reduced to fragments comparable to the lighter material and is urged towards the outlet 22. After being subjected to these impacts, the processed crop residue is then discharged from an outlet 22 of the elongate housing 12.

Prior to use, the apparatus 10 may start at a position wherein the elongate housing 12 lays flat in a horizontal position. However, the elongate housing 12 may be in a different starting position. The elongate housing 12 is then inclined so that the outlet 22 is elevated higher than that of the inlet 20. The elongate housing 12 is then fixed at the desired angle of inclination, before initiating rotation of the rotors 24, 26 and feeding the crop residue into the inlet 20. This results in increased efficiency of denser material destruction according to the angle of inclination. In an example, the apparatus 10 was used to process rye grass seeds at various angles of inclination and rotor speeds. The results are shown in the table below.

| Speed of Rotors (rpm) | Inclination (°) | Heavy Material Reduction (%) |
|---|---|---|
| 800 | 3 | 55 (by observation) |
| 1000 | 3 | 70 (by observation) |
| 1200 | 3 | 80 (by observation) |
| 1330 | 5 | 85 (by observation) |
| 1200 | 30 | 90 (by observation) |
| 1280 | 40 | 95 (by observation) |
| 1330 | 45 | 97 (by germination test) |

The apparatus is intended to be arranged as part of a system comprising a mechanical harvester. The apparatus may be mounted on a wheeled chassis to be towed behind the mechanical harvester, or mounted directly on the mechanical harvester. The mechanical harvester has means for feeding crop residue to the inlet 20 of the elongate housing 12 so that the apparatus may process the crop residue.

Modifications may be made to the present invention within the context of that described and shown in the drawings. Such modifications are intended to form part of the invention described in this specification.

The invention claimed is:

1. A mobile apparatus for processing a crop residue to damage weed seeds therein, comprising:
    a housing having a first housing portion and a second housing portion, the first housing portion in the form of two parallel longitudinally connected partial cylinders with a longitudinally extending opening between the partial cylinders, the first housing portion having a first end and a second end, the first end comprising an inlet for receiving a feed of the crop residue and the second end comprising an output for providing the crop residue to the second housing portion, the second housing portion comprising an outlet for discharging the crop residue after it is processed, an inner wall surface of the first housing portion being cylindrical in shape for allowing flow of air and crop residue in a longitudinal direction through the first housing portion;
    two parallel rotors, each of the two parallel rotors located axially within a respective one of the partial cylinders, the rotors being configured to be rotated in the same direction as each other, each rotor comprising a plurality of radially extending blunt impact members;
    wherein the plurality of radially extending rigid blunt impact members are configured to rotate with the rotors such that the crop residue is moved towards the longitudinally extending opening between the partial cylinders and is subjected to impacts that damage at least some of the weed seeds before the crop residue is discharged from the outlet.

2. The apparatus for processing the crop residue according to claim 1, wherein the apparatus for processing the crop residue further comprises one or more blowers arranged to urge the crop residue to move through the housing in a manner in which the speed of rotation of the impact members and the speed of air movement by the one or more blowers is such that there is differentiated impacts of the denser material in the crop residue in relation to the less denser material in the crop residue, wherein at least one blower of the one or more blowers is in the form of a paddle of a spreader located at the second end of the housing.

3. The apparatus for processing the crop residue according to claim 2, wherein the apparatus is configured so that the denser material is weed seeds which are retained in the first housing portion until the weed seeds are sufficiently impacted so as to damage a substantial amount of the weed seeds in the crop residue before the crop residue exits the outlet and the less denser material is the remainder of the crop residue which has received fewer impacts than the weed seeds within the housing when the crop residue exits the outlet.

4. The apparatus for processing the crop residue according to claim 1, wherein the first housing portion has a consistent cross-section of the internal face along the length of the first housing portion and the first housing portion is shaped so that the internal face of the housing corresponds to the outer dimensions of the rotors and the impact members sweep crop residue along the internal face as the rotors rotate.

5. The apparatus for processing the crop residue according to claim 1, wherein the first housing portion is shaped so that it follows the orbit of a tip of each of the impact members; wherein the impact members are arranged to move at least a portion of the crop residue towards the outlet, and the impact members are arranged to move at least the same or another portion of the crop residue along the internal face of the first housing portion in a direction at least in part towards the second end.

6. The apparatus for processing the crop residue according to claim 1, wherein the plurality of impact members rotate with velocity so as to damage the weed seeds in the crop residue upon impact and chaff of the crop residue passes though the housing more quickly seeds and is less damaged by the impact members.

7. The apparatus for processing the crop residue according claim 1, wherein the housing comprises a restricted opening at the outlet of the housing, wherein the restricted opening is defined by a hole in an axial end wall of the housing, wherein the restricted opening is in an inwardly projecting annulus.

8. The apparatus for processing the crop residue according to claim 1, wherein the apparatus comprises a spreader for spreading the crop residue exiting the outlet, wherein the spreader comprises a rotating paddle to move the crop residue from the outlet out of the spreader.

9. The apparatus for processing the crop residue according to claim 1, wherein the apparatus is mounted to a wheeled chassis of an agricultural vehicle capable of traversing a crop field.

10. The apparatus for processing the crop residue according to claim 1, wherein the plurality of rigid blunt impact members comprise at least three of such rigid blunt impact members arranged in a helical configuration, and the distance of an internal wall of the first housing portion from the axis of rotation of the respective rotor is the same along the length of the first housing portion.

11. The apparatus for processing the crop residue according to claim 10, wherein the helical configuration comprises arranging the rigid blunt impact members sequentially in a progressive angular offset from each other.

12. The apparatus for processing the crop residue according to claim 10, wherein the helical configuration acts as a mechanism for moving air and the crop residue from the first end towards the second end of the first housing portion.

13. The apparatus for processing the crop residue according to claim 12, wherein each rigid blunt impact members comprises a rectangular cross section transverse to the length of the respective rigid blunt impact member.

14. The apparatus for processing the crop residue according to claim 1, wherein each rigid blunt impact member comprises a radially extending flat face wherein the flat face extends parallel to the respective axis of the rotor from which the impact member radially extends.

15. The apparatus for processing the crop residue according to claim 1, wherein the output comprising a wide opening providing an unhindered path of movement of the crop residue through the output between the respective rotor and a peripheral edge of the wide opening where the crop residue able to pass through the wide output is of varying size.

16. The apparatus for processing the crop residue according to claim 1, wherein the radially extending rigid blunt impact members are only in the first housing portion.

17. The apparatus for processing the crop residue according to claim 1, wherein the inlet is in the form of an aperture in a radially extending end wall of each partial cylinder, the respective end wall being adjacent to a first of the impact members to direct the crop residue into the impact members and which blocks movement of the crop residue away from the rotors.

18. The apparatus for processing the crop residue according to claim 17, wherein the radially extending end walls direct airflow created by rotation of the rotors radially of the respective rotor and towards the second end of the housing.

19. The apparatus for processing the crop residue according to claim 1, wherein the outlet is open to permit discharge of processed crop residue irrespective of size.

20. The apparatus for processing the crop residue according to claim 1, wherein the housing is arranged to be horizontal or inclined from the horizontal.

21. The apparatus for processing the crop residue according to claim 1, wherein the housing comprises a mount for mounting the housing on a mobile agricultural machine and the input being connected to a source of crop residue, and the output is directed to the ground.

22. A method for processing a crop residue, comprising:
providing a mobile apparatus having a housing;
receiving the crop residue in an inlet of the housing in the form of two intersecting partial cylinders with a longitudinally extending opening between the partial cylinders;
rotating a respective radially extending rigid blunt impact members about an axis of rotation that extends longitudinally within each corresponding one of the partial cylinders, wherein the direction of rotation about each axis of rotation is in the same direction;
directing the crop residue into the plurality of rotating radially extending rigid blunt impact members;
moving the crop residue through the housing toward an outlet of the housing by sweeping action of the impact members, the movement at least in part being along a cylindrical internal surface of the housing;
subjecting the crop residue to impacts as or after it tangentially enters the opening between the intersecting partial cylinders so as to damage weed seeds in the crop residue; and
discharging the crop residue from the outlet of the housing after the crop residue is subjected to the impact.

23. The method for processing the crop residue according to claim 22, wherein the method further comprises inclining the housing so as to partially retain the weed seeds of the crop residue in the housing.

24. The method for processing the crop residue according to claim 22, wherein the method further comprises directing the crop residue into an orbital path of the impact members.

25. The method for processing the crop residue according to claim 22, wherein the subjecting the crop residue to impacts further comprises the impact members causing damage to weed seeds present in the crop residue.

26. The method according to claim 25, wherein the crop residue is received directly from a header harvesting from a crop field in a continuous processing manner and the processed crop residue is deposited on the crop field.

27. The method for processing the crop residue according to claim 22, wherein a less dense crop residue portion of the crop residue is influenced by a longitudinal air flow force more than the weed seeds are influenced by the longitudinal air flow, and the weed seeds of the crop residue is influenced by a centrifugal force imparted by the rotating impact members more than the less dense crop residue portion is influenced by the centrifugal force.

28. A mobile apparatus for processing a crop residue containing weed seeds, the apparatus comprising:
 a housing having an inlet at a first end for receiving the crop residue,
 the housing having two rotors arranged to rotate at an effective speed, each rotor comprising a plurality of radially extending blunt impact members;
 wherein the effective speed is such that the plurality of radially extending impact members impact against the crop residue when rotating, so that a chaff material of the crop residue is subjected to less impacts, without being milled, and the weed seeds of the crop residue is subjected to relatively more impacts, thereby destroying a substantial proportion of the weed seeds in the crop residue, and
 the housing having an outlet at a second end for discharging the crop residue;
 wherein the housing is mounted on a vehicle base for movement through a crop field; and
 wherein the housing is shaped in the form of two intersecting cylinders having cylindrically shaped inner surface extending along a length of the housing, spaced by a small distance from the radial ends of the rigid blunt impact members such that in operation the weeds seeds are swept back and forth between the cylinders into an oncoming path of the rotating rigid blunt impact members.

29. The apparatus according to claim 28, further comprising a blower arranged to urge the chaff material of the crop residue through the housing to the outlet, with less influence on the weed seeds in the crop residue.

30. The apparatus according to claim 28, wherein the housing comprises an inwardly directed annulus at the outlet such that the weed seeds are prevented from exiting the outlet of the housing along a perimeter wall of the housing.

* * * * *

UNITED STATES PATENT AND TRADEMARK OFFICE
CERTIFICATE OF CORRECTION

| | | |
|---|---|---|
| PATENT NO. | : 11,425,865 B2 | Page 1 of 1 |
| APPLICATION NO. | : 15/755952 | |
| DATED | : August 30, 2022 | |
| INVENTOR(S) | : Lewis Thomas and Matthew Barrett-Lennard | |

It is certified that error appears in the above-identified patent and that said Letters Patent is hereby corrected as shown below:

On the Title Page

Item (12): DELETE "Thomas et al." and INSERT --Lewis et al.--

Item (72): DELETE "Lewis Thomas" and INSERT --Thomas Lewis--

Signed and Sealed this
Twelfth Day of November, 2024

Katherine Kelly Vidal
*Director of the United States Patent and Trademark Office*